US008364739B2

(12) United States Patent
Baskaran et al.

(10) Patent No.: US 8,364,739 B2
(45) Date of Patent: Jan. 29, 2013

(54) SPARSE MATRIX-VECTOR MULTIPLICATION ON GRAPHICS PROCESSOR UNITS

(75) Inventors: Muthu M. Baskaran, Columbus, OH (US); Rajesh J. Bordawekar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 12/569,942

(22) Filed: Sep. 30, 2009

(65) Prior Publication Data

US 2011/0078226 A1 Mar. 31, 2011

(51) Int. Cl.
*G06F 17/16* (2006.01)
(52) U.S. Cl. .................. 708/607; 708/520; 706/12
(58) Field of Classification Search .............. 708/520, 708/607; 706/12
See application file for complete search history.

(56) References Cited

U.S. PATENT DOCUMENTS

| | | | | |
|---|---|---|---|---|
| 7,970,717 | B2 * | 6/2011 | Haffner | 706/12 |
| 8,024,677 | B2 * | 9/2011 | Lenahan et al. | 716/54 |
| 2010/0223258 | A1 * | 9/2010 | Ghahramani et al. | 707/723 |
| 2010/0306300 | A1 * | 12/2010 | Lu et al. | 708/520 |

OTHER PUBLICATIONS

Haffner, P. "Fast Transpose Methods for Kernel Learning on Sparse Data" Proceedings of the 23rd International Conference on Machine Learning. Jun. 25-29, 2006.*
AMD Stream SDK. http://ati.amd.com/technology/streamcomputing/.
Bell et al. Efficient Sparse Matrix-Vector Multiplication on CUDA. NVIDIA Technical Report NVR- 2008-004, NVIDIA Corporation, Dec. 2008.
Bik et al. Automatic Data Structure Selection and Transformation for Sparse Matrix Computations. IEEE Trans. Parallel Distrib. Syst., 7(2):109-126, 1996.
Blelloch. Prefix Sums and Their Applications. Technical report, 1990.
Buatois et al. Concurrent Number Cruncher: An Efficient Sparse Linear Solver on the GPU. In High Performance Computation Conference (HPCC), Springer Lecture Notes in Computer Sciences, 2007.
CUDPP: CUDA Data Parallel Primitives Library. http://www.gpgpu.org/developer/cudpp/.
Davis et al. The University of Florida Sparse Matrix Collection. ACM Trans. on Mathematical Software. http://www.cise.ufl.edu/research/sparse/matrices.
Dotsenko et al. Fast Scan Algorithms on Graphics Processors. In ACM ICS'08, pp. 205-213, 2008.
GPGPU: General-Purpose Computation Using Graphics Hardware. http://www.gpgpu.org/.
Bolz et al. Sparse Matrix Solvers on the GPU: Conjugate Gradients and Multigrid. ACM Transactions on Graphics, 22:917-924, 2003.

(Continued)

*Primary Examiner* — Tammara Peyton
(74) *Attorney, Agent, or Firm* — Ryan, Mason & Lewis, LLP

(57) ABSTRACT

Techniques for optimizing sparse matrix-vector multiplication (SpMV) on a graphics processing unit (GPU) are provided. The techniques include receiving a sparse matrix-vector multiplication, analyzing the sparse matrix-vector multiplication to identify one or more optimizations, wherein analyzing the sparse matrix-vector multiplication to identify one or more optimizations comprises analyzing a non-zero pattern for one or more optimizations and determining whether the sparse matrix-vector multiplication is to be reused across computation, optimizing the sparse matrix-vector multiplication, wherein optimizing the sparse matrix-vector multiplication comprises optimizing global memory access, optimizing shared memory access and exploiting reuse and parallelism, and outputting an optimized sparse matrix-vector multiplication.

25 Claims, 4 Drawing Sheets

OTHER PUBLICATIONS

Im and Yelick. Optimizing Sparse Matrix Computations for Register Reuse in SPARSITY. In Proceedings of the International Conference on Computational Science, vol. 2073 of LNCS, pp. 127-136, San Francisco, CA, May 2001. Springer.

Im et al. SPARSITY: Optimizing Framework for Sparse Matrix Kernels. International Journal of High Performance Computing Applications, 18(1):135-158, Feb. 2004.

Mellor-Crummey and Garvin. Optimizing Sparse Matrix-Vector Product Computations Using Unroll and Jam. Int. J. High Perform. Comput. Appl., 18(2):225-236, 2004.

Mellor-Crummey et al. Improving Memory Hierarchy Performance for Irregular Applications Using Data and Computation Reorderings. Int. J. Parallel Program., 29(3), 2001.

Nishtala et al. When Cache Blocking Sparse Matrix Vector Multiply Works and Why. In Proceedings of the PARA'04 Workshop on the Stateof-the-art in Scientific Computing, Copenhagen, Denmark, Jun. 2004.

NVIDIA CUDA. http://developer.nvidia.com/object/cuda.html.

Khronos Group, Open Computing Language (OpenCL). http://www.khronos.org/news/press/releases/khronos launches heterogeneous computing initiative/.

Sengupta et al. Scan Primitives for GPU Computing. In GH '07: Proceedings of the 22nd ACM SIGGRAPH/EUROGRAPHICS symposium on Graphics hardware, pp. 97-106, 2007.

Strout et al. Compile-time Composition of Run-time Data and Iteration Reorderings. In ACM PLDI '03, 2003.

Temam et al. Characterizing the Behavior of Sparse Algorithms on Caches. In Supercomputing '92: Proceedings of the 1992 ACM/IEEE conference on Supercomputing, pp. 578-587, 1992.

Vuduc et al. OSKI: A Library of Automatically Tuned Sparse Matrix Kernels. In Proceedings of SciDAC 2005, Journal of Physics: Conference Series, San Francisco, CA, USA, Jun. 2005. Institute of Physics Publishing.

Vuduc and Moon. Fast Sparse Matrix Vector Multiplication by Exploiting Variable Block Structure. In Proceedings of the International Conference on High-Performance Computing and Communications, LNCS 3726, Sorrento, Italy, Sep. 2005.

Williams et al. Optimization of Sparse Matrix-vector Multiplication on Emerging Multicore Platforms. In SC '07: Proceedings of the 2007 ACM/IEEE conference on Supercomputing, pp. 1-12, 2007.

* cited by examiner

SPARSE MATRIX-VECTOR MULTIPLICATION ON GRAPHICS PROCESSOR UNITS

FIELD OF THE INVENTION

Embodiments of the invention generally relate to information technology, and, more particularly, to graphics processor units.

BACKGROUND OF THE INVENTION

Graphics processor units (GPUs) are emerging as powerful massively parallel systems. Also, the introduction of application programming interfaces (APIs) for general-purpose computations on GPUs (for example, compute unified device architecture (CUDA) from NVIDIA), makes GPUs an attractive choice for high-performance numerical and scientific computing. Sparse matrix-vector multiplication (SpMV) is a heavily used kernel in scientific computing. However, with indirect and irregular memory accesses resulting in more memory accesses per floating point operation, optimization of SpMV kernel is a significant challenge in any architecture under existing approaches. Existing approaches, for example, also do not take into account various architectural constraints for optimizing memory access patterns.

SUMMARY OF THE INVENTION

Principles and embodiments of the invention provide techniques for sparse matrix vector multiplication on graphics processor units. An exemplary method (which may be computer-implemented) for optimizing sparse matrix-vector multiplication (SpMV) on a graphics processing unit (GPU), according to one aspect of the invention, can include steps of receiving a sparse matrix-vector multiplication, analyzing the sparse matrix-vector multiplication to identify one or more optimizations, wherein analyzing the sparse matrix-vector multiplication to identify one or more optimizations comprises analyzing a non-zero pattern for one or more optimizations and determining whether the sparse matrix-vector multiplication is to be reused across computation, optimizing the sparse matrix-vector multiplication, wherein optimizing the sparse matrix-vector multiplication comprises optimizing global memory access, optimizing shared memory access and exploiting reuse and parallelism, and outputting an optimized sparse matrix-vector multiplication.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include optimizing sparse matrix-vector multiplication (SpMV) on graphics processing units (GPUs) using model-driven compile- and run-time strategies. Because SpMV is a memory-bound application, it is advantageous to improve its memory behavior so that the performance improves with increasing number of processor cores, which is expected to be a trend in the emerging many-core systems. One or more embodiments of the invention include providing a system which statically and dynamically identifies algorithmic and architectural optimizations to be performed for efficient execution of SpMV kernels on GPUs through self-inference of irregular access pattern and optional user annotations.

As detailed herein, one or more embodiments of the invention can include optimizations such as, (1) exploiting synchronization-free parallelism, (2) optimized thread mapping based on the affinity towards optimal memory access pattern, (3) optimized off-chip memory access to tolerate the high access latency, and (4) exploiting data locality and reuse.

The techniques described herein include addressing inter-related concerns in improving the performance of memory-bound applications, namely, thread mapping and data access strategies. One or more embodiments of the invention implement an effective and optimized SpMV kernel on GPUs that consider the architectural characteristics, and optimize over the compressed sparse row (CSR) storage format. Such a solution as detailed herein in one or more embodiments of the invention does not change the storage format of sparse matrices and retains the more general CSR format. Furthermore, unlike existing approaches, there is no preprocessing performed to change the data layout of matrix elements or input/output vector elements.

Figure 1:
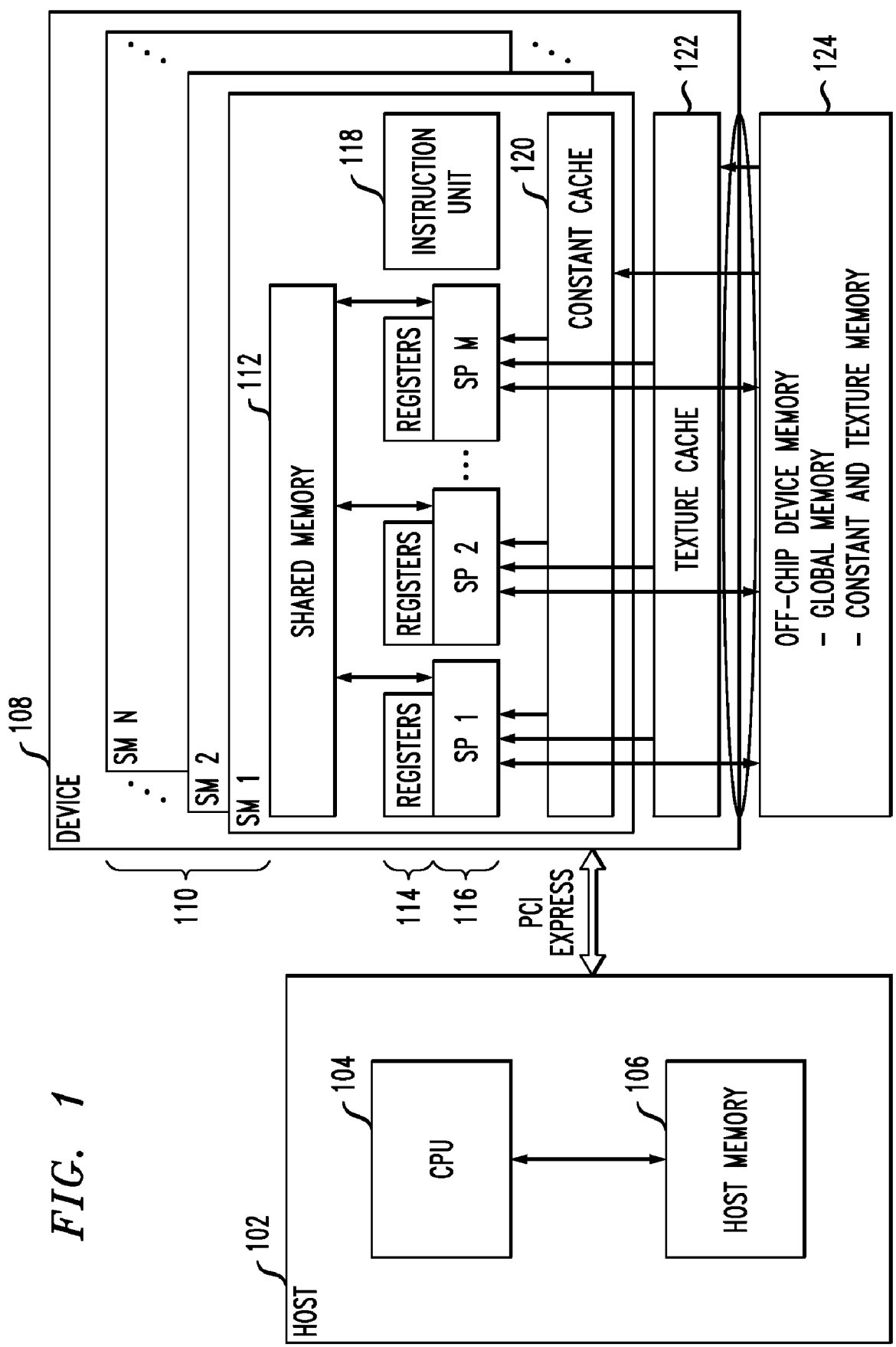
FIG. 1 is a diagram illustrating exemplary general purpose computation on graphics processing units (GPUs) architecture, according to an embodiment of the invention.

FIG. 1 is a diagram illustrating exemplary general purpose computation on graphics processing units (GPUs) architecture, according to an embodiment of the invention. By way of illustration, FIG. 1 depicts a host 102, which includes a central processing unit (CPU) 104 and a host memory 106. As also depicted by FIG. 1, host 102 interacts (via peripheral component interconnect (PCI) express) with a device 108, which includes levels of streaming multiprocessors (SMs) 110 (for example, SM 1, SM 2, SM N), a shared memory component 112, a level of registers 114, a level of streaming processors (SPs) (for example, SP 1, SP 2, SP M), an instruction unit 118, a constant cache component 120 and a texture cache component 122. FIG. 1 also depicts an off-chip device memory component 124, that can include global memory and/or constant and texture memory.

Additionally, as noted above and depicted in FIG. 1, a GPU parallel computing architecture includes a set of multiprocessor units called streaming multiprocessors (SMs) 110, each one containing a set of processor cores (called the streaming processors (SPs) 116). There are various memories available in GPUs for a programmer, and the memories can be organized in a hybrid cache and local-store hierarchy. The memories can include, for example, off-chip global memory, off-chip local memory, on-chip shared memory, off-chip constant memory with on-chip cache, off-chip texture memory with on-chip cache, and on-chip registers.

The global memory is a large memory and has a very high latency. The shared memory is present in each SM and is organized into banks. When multiple addresses belonging to the same bank are accessed at the same time, it results in bank conflict. Each SM also has a set of registers. The constant and texture memories are read-only regions in the global memory space and they have on-chip read-only caches. Accessing constant cache is faster, but it has only a single port and hence it is beneficial when multiple processor cores load the same value from the cache. Texture cache has higher latency than constant cache, but it does not suffer greatly when memory read accesses are irregular, and it is also beneficial for accessing data with two-dimensional (2D) spatial locality.

Figure 2:
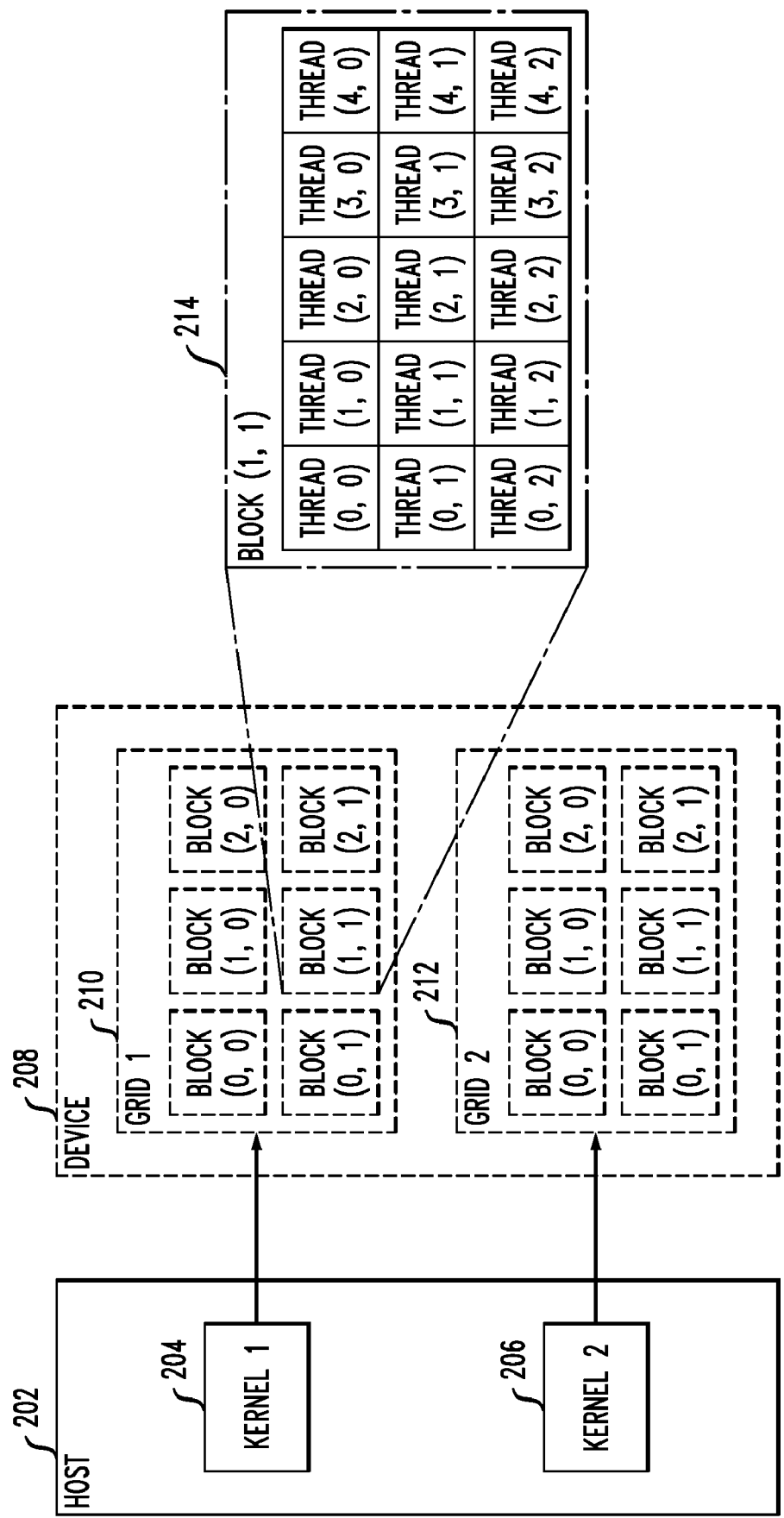
FIG. 2 is a diagram illustrating an exemplary compute unified device architecture (CUDA) model, according to an embodiment of the present invention.

FIG. 2 is a diagram illustrating an exemplary compute unified device architecture (CUDA) model, according to an embodiment of the present invention. By way of illustration, FIG. 2 depicts a host 202, which includes kernel 1 (component 204) and kernel 2 (component 206), as well as device 208, which includes grid 1 (component 210) and grid 2 (component 212). As shown in FIG. 2, kernel 1 provides input to grid 1, and kernel 2 provides input to grid 2. Also, FIG. 2 depicts an exemplary block 214 from grid 1, wherein the block includes a number of threads.

As depicted in FIG. 2, a kernel is executed as a grid of thread blocks, wherein a thread block is a batch of threads that can cooperate with each other. Also, a thread block is mapped to a SM, and a thread is mapped to a SP.

Programming GPUs for general-purpose applications can be enabled, for example, through a C/C++ language interface exposed by the NVIDIA CUDA technology. The CUDA programming model provides an abstraction of the GPU parallel architecture using a minimal set of programming constructs such as a hierarchy of threads, a hierarchy of memories, and synchronization primitives. A CUDA program can include, as depicted in FIG. 2, a host program which is run on the central processing unit (CPU) or host and a set of CUDA kernels that are launched from the host program on the GPU device. The CUDA kernel is a parallel kernel that is executed on a set of threads. The threads are organized into groups called thread blocks, and the threads within a thread block synchronize among themselves through barrier synchronization primitives in CUDA and they communicate through a shared memory space that is available to the thread block.

A kernel a grid of one or more thread blocks. Each thread in a thread block is uniquely identified by its thread identifier (id) (threadIdx) within its block and each thread block is uniquely identified by its block id (blockIdx). Each CUDA thread has access to various memories at different levels in the hierarchy, and the threads have a private local memory space and register space. The threads in a thread block share a shared memory space, and the GPU dynamic random access memory (DRAM) is accessible by all threads in a kernel.

The GPU computing architecture can employ a single instruction multiple threads (SIMT) model of execution. The threads in a kernel are executed in groups called warps, where a warp is a unit of execution. The scalar SPs within a SM share a single instruction unit and the threads of a warp are executed on the SPs. All the threads of a warp execute the same instruction and each warp has its own program counter.

To fully exploit the massive computing resources of the GPUs, off-chip memory latency needs to be efficiently hidden. Thus, optimizations for enhancing the memory performance are critical to GPU systems for utilizing their raw computing power. Hence, reducing the memory footprint and tolerating the memory access latency are important for high performance, especially for memory-bound applications.

Matrix vector multiplication is a memory-bound application kernel in which each matrix element that is brought from memory is used only once in the computation. As such, the kernel is characterized by a high memory overhead per floating point operation. When the matrix is sparse, it incurs further complexity in terms of memory overhead because of the indirect and irregular memory accesses. Sparse matrix vector (SpMV) multiplication involves, on an average, more than two memory operations for accessing a single non-zero matrix element and is heavily memory-bound. In addition, the SpMV-specific optimizations depend heavily on the structural properties of the sparse matrix, many of which might be known only at run-time.

As detailed herein, GPU architecture has multiple low latency memories in addition to the off-chip DRAM, and has a hybrid cache and local-store hierarchy. The characteristics of the various memories available in the GPU can be diverse in terms of latency, optimal memory access pattern, and control (either hardware-controlled or software-controlled). This can impose several challenges to effectively reduce memory footprint and hide latency. The optimal access pattern is also dependent on the manner in which threads are mapped for computation and also on the number of threads involved in global memory access, as involving more threads would assist in hiding the global memory access latency. Consequently, there should be an optimal thread mapping to ensure optimized memory access.

As such, one or more embodiments of the invention include enhancing memory performance for utilizing the high computation power of GPU systems, especially for memory-bound applications such as the SpMV kernel. Further, one or more embodiments of the invention can, by way of example, base optimizations on the general CSR format as well as provide ways to adapt CSR storage format to suit the GPU architecture.

As described herein, one or more embodiments of the invention include exploiting synchronization-free parallelism. The CUDA programming model, by way of example, can provide an application programming interface (API) to synchronize across all threads belonging to a thread block. However, there is no API in CUDA to synchronize between thread blocks. To synchronize between thread blocks, the CUDA programmer has to explicitly implement synchronization primitives using atomic reads/writes in the global memory space, which incurs a high overhead. As such, one or more embodiments of the invention utilize synchronization-free parallelism across thread blocks. In SpMV computation, the parallelism available across rows enables distribution of computations corresponding to a row or a set of rows to a thread block as opposed to allocating one thread to perform the computation corresponding to one row and a thread block to handle a set of rows.

In GPUs, thread mapping for computation should ensure that sufficient threads are involved to hide global memory access latency and also ensure that the global memory access is optimized, as it is critical for performance. The most optimal pattern of access for global memory is the hardware optimized coalesced access pattern that would be enabled when consecutive threads of a half-warp (that is, a group of 16 threads) access consecutive elements. It is, therefore, advantageous to involve multiple threads for the computation corresponding to each row, and also arrive at a thread mapping based on the affinity towards optimal memory access pattern.

The thread mapping strategy in one or more embodiments of the invention includes mapping multiple threads (16 threads) per row such that consecutive threads access consecutive non-zero elements of the row in a cyclic fashion to compute partial products corresponding to the non-zero elements. The threads mapped to a row can compute the output vector element corresponding to the row from the partial products through parallel sum reduction. The partial products can be stored in shared memory as they are accessed only by threads within a thread block.

One or more embodiments of the invention can also include optimizing (aligned) global memory access. Global memory access coalescing is applicable to memory requests issued by threads belonging to the same half-warp. The global memory can be assumed to include aligned memory segments, and one or more embodiments of the invention base usage on memory requests for 32-bit words.

By way of example, in a 8800 GTX device, when all 16 words requested by the threads of a half-warp lie within the same 64 byte memory segment and if consecutive threads access consecutive words, then all the memory requests of the half-warp are coalesced into one memory transaction. But if that access pattern is not followed among the threads of a half-warp, then it results in 16 separate memory requests. However, for example, in a GTX 280 device, the access pattern need not be so strict for coalescing to happen. In GTX 280, the hardware detects the number of 128 byte memory segments that hold the 16 words requested by the threads of a half-warp and issues as many memory transactions. There is no restriction on the sequence of access within the threads of a half-warp.

In both GPU devices, when the base address of global memory access requests issued by the threads of a half-warp aligned to memory segment boundary and the threads access words in sequence, it results in fewer memory transactions. As such, one or more embodiments of the invention include adjusting the computation to force the access pattern to be aligned in the above-mentioned manner.

In the SpMV kernel, the number of non-zeros in a row varies across rows, and hence the starting non-zero of a row might be in a non-aligned position in the value array that stores the non-zeros of the sparse matrix. If the computation proceeds without taking care of the alignment issue, all rows whose starting non-zero is located in an non-aligned position will be entirely accessed in an non-optimal manner and eventually lead to increased memory access cost. As such, the techniques detailed herein include solutions to resolve the issue and achieve optimized aligned accesses.

For example, one or more embodiments of the invention view a row as having an initial (possible) non-aligned portion and then an aligned portion. The execution can proceeds by first computing the partial products for the non-zeros in the non-aligned portion of the row, if it exists, before proceeding to compute the partial products for the aligned portion. Further, in one or more embodiments of the invention, zeros are padded to ensure that the number of entries in each row is a multiple of 16.

Additionally, the techniques described herein include exploiting data locality and reuse. The input and output vectors exhibit data reuse in SpMV computation. The reuse of output vector elements can be achieved by exploiting synchronization-free parallelism with optimized thread mapping, which ensures that partial contributions to each output vector element are computed only by a certain set of threads and the final value is written only once. The reuse pattern of input vector elements depends on the non-zero access pattern of the sparse matrix.

Also, exploiting data reuse of the input vector elements within a thread or among threads within a thread block can be technically achieved by caching the elements in on-chip memories. The on-chip memory may be, for example, texture (hardware) cache, registers or shared memory (software) cache. Utilizing registers or shared memory to cache input vector elements can include a programmer identifying the portions of vector that are reused, which in turn, requires the identification of dense sub-blocks in the sparse matrix. This requires an analysis of the sparse matrix (possibly at runtime). However, using the hardware texture cache does not necessarily require analysis of the sparse matrix pattern.

In one or more embodiments, using texture cache can reduce global memory traffic, especially reduce non-coalesced accesses, and hence increase global memory bandwidth. Additionally, one or more embodiments of the invention can include exploiting one-dimensional (1D) spatial locality using texture cache. As such, texture memory can be used to store the input vector and utilize the read-only texture cache to achieve the afore-mentioned performance gains.

The techniques detailed herein can also include performing a run-time preprocessing of the sparse matrix to identify and extract dense sub-blocks. A block storage format can be implemented that suits the GPU architecture. The features of the format can include, for example, sticking to constant block sizes that enable fine-grained thread-level parallelism, to avoid the memory access penalty in reading block size and block index (which is needed if the block size is allowed to vary). Features can also include enforcing that a starting column of a block should adhere to the alignment constraints of global memory coalescing, as well as not making the entire block dense by filling up zeros. Rather, one or more embodiments of the invention include allowing each row in a block to have variable number of entries, and filling up minimal zeros that are just enough to make the number of entries in each row of a block to be a multiple of half-warp size.

For every block, the required input vector elements are loaded from global memory to shared memory, and they are reused across the rows of a block. The number of input vector elements loaded for every block is equal to the block size along column, and since the size is fixed, there is no additional memory access involved to read the block size. By enforcing the constraint that a starting column index must be a multiple of half-warp size and that the number of entries in each row of a block must be a multiple of half-warp size, in one or more embodiments of the invention, block storage along with optimized thread mapping ensures that the input vector elements and the sparse matrix elements are accessed in a coalesced manner.

In one or more embodiments of the invention, the loads from global memory to shared memory are optimal if they involve 16 coalesced accesses. However, in many practical sparse matrices, the dense sub-blocks present can be very small. As such, in one or more embodiments of the invention, run-time preprocessing to identify and extract dense sub-blocks, in its current state of implementation, does not yield better performance for most of the matrices, and using texture cache for data reuse outperforms the approach of performing run-time preprocessing and using shared memory cache for data reuse.

Additionally, the techniques described herein can include tuning configuration parameters. The number of threads per thread block has a direct implication on the effective utilization of processors to hide the latency of global memory accesses. For example, fewer threads (resulting in fewer warps) might fail to hide the latency of global memory access when the number of active thread blocks in a multiprocessor is low. One or more embodiments of the invention can include varying the number of threads per thread block used for execution (for example, 64, 128, 256, and 512).

The number of thread blocks can depend on the number of rows in the matrix and can be equal to $$\frac{\text{number of rows} \times \text{number of threads handling a row}}{\text{number of threads in a thread block}}.$$

However, if the number of thread blocks is disadvantageously kept fixed at a value irrespective of the number of rows, then depending on the number of rows, some thread blocks may have to handle multiple blocks of rows.

Additionally, one or more embodiments of the invention can include varying number of threads handling a row. By way of example, one or more embodiments of the invention include using 16 threads to handle the computation pertaining to a row (based on the architectural feature that memory coalescing rules are defined for a half warp, that is, 16 threads). 16 threads is, also, the minimum number of threads that can guarantee coalescing. The number of non-zeros can be very low, even less than 16, and when 16 is chosen as a general default choice, the penalty incurred for such cases (when there are less non-zeros per row) would be less compared to that while choosing 32 or 64. Also, there is a reduction involved per row for reducing the partial products that are computed in parallel by the threads. 16 threads lead to lower reduction cost while utilizing a good amount of parallelism.

As detailed herein, one or more embodiments of the invention include providing architectural optimizations in GPUs for efficient execution as well as optimizations that take into account, for example, the application and the architectural characteristics. One or more embodiments of the invention also include developing modules for an optimization framework including, for example, an inspector to find reuse factor for an input vector and a cost model to characterize memory access. Further, the techniques described herein include significant performance improvements over existing parallel SpMV implementations.

Figure 3:
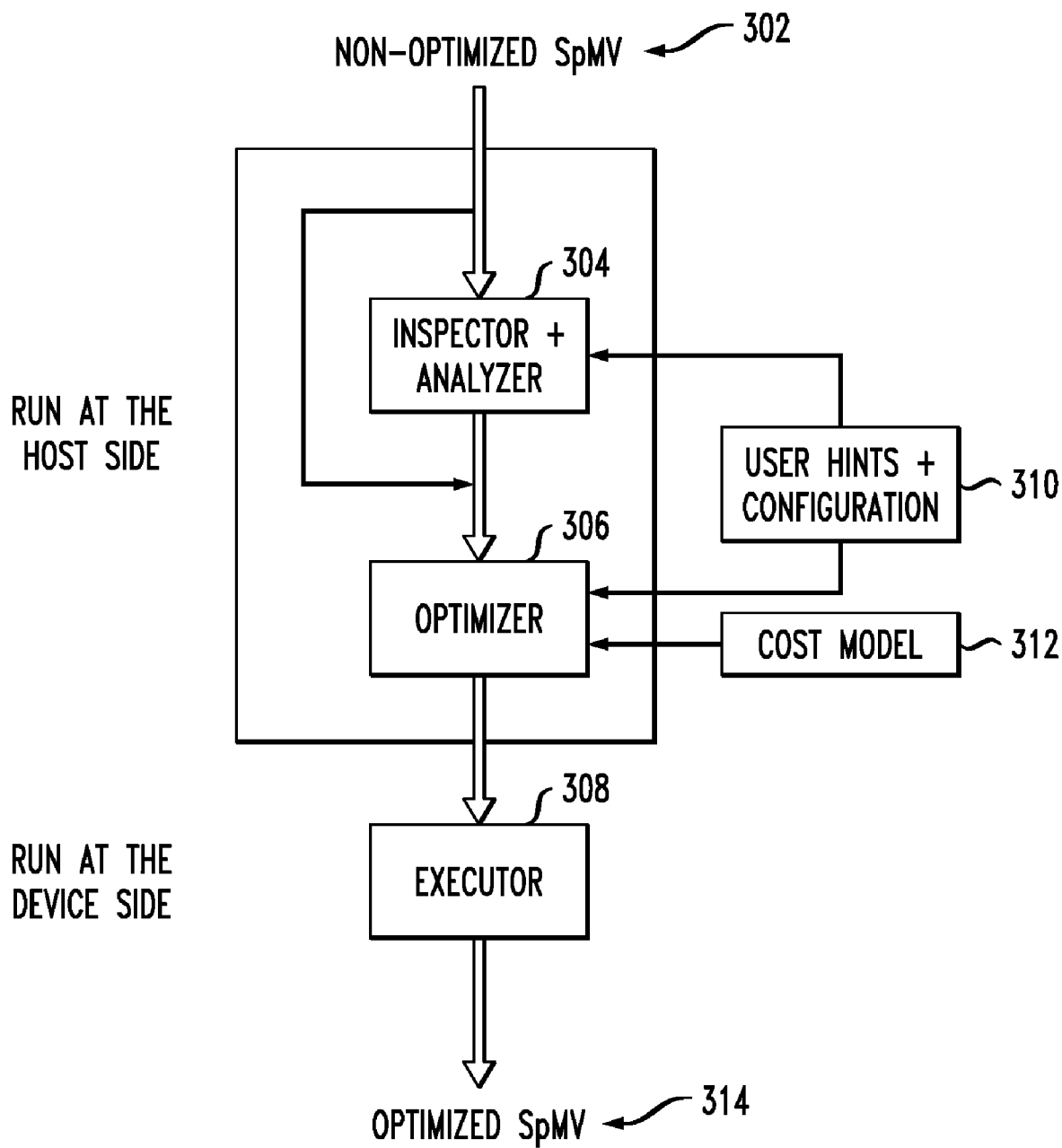
FIG. 3 is a diagram illustrating optimizing sparse matrix-vector multiplication (SpMV) on GPUs, according to an embodiment of the invention.

FIG. 3 is a diagram illustrating optimizing sparse matrix-vector multiplication (SpMV) on GPUs, according to an embodiment of the invention. By way of illustration, FIG. 3 depicts a non-optimized SpMV 302, which is input to an inspector-analyzer module 304, which provides input to an optimizer module 306. The optimizer module 306 receives input from the cost model module 312, and both the inspector-analyzer module 304 and the optimizer module 306 can receive input from a user hints and configuration module 310. Also, as depicted in FIG. 3, the optimizer module 306 provides input to the executor module 308, which generates and outputs an optimized SpMV 314. Additionally, the inspect-analyzer module 304 and optimizer module 306 can be run at the host side, while the executor module 308 can be run at the device side.

As illustrated in FIG. 3, an inspector-analyzer module 304 analyzes the non-zero pattern for better optimizations, and pre-processes and analyzes the sparse matrix if the same sparse matrix is to be reused across computation (for example, linear solvers (CG)). Also, the optimizer module 306 optimizes global memory access (for example, coalesces accesses), optimizes shared memory access, and exploits reuse and parallelism. A cost model module 312 can be used to characterize memory access cost, the type and level of memory, as well as access pattern. An executor module 308 produces a final code, which can depend on the optimization performed.

Figure 4:
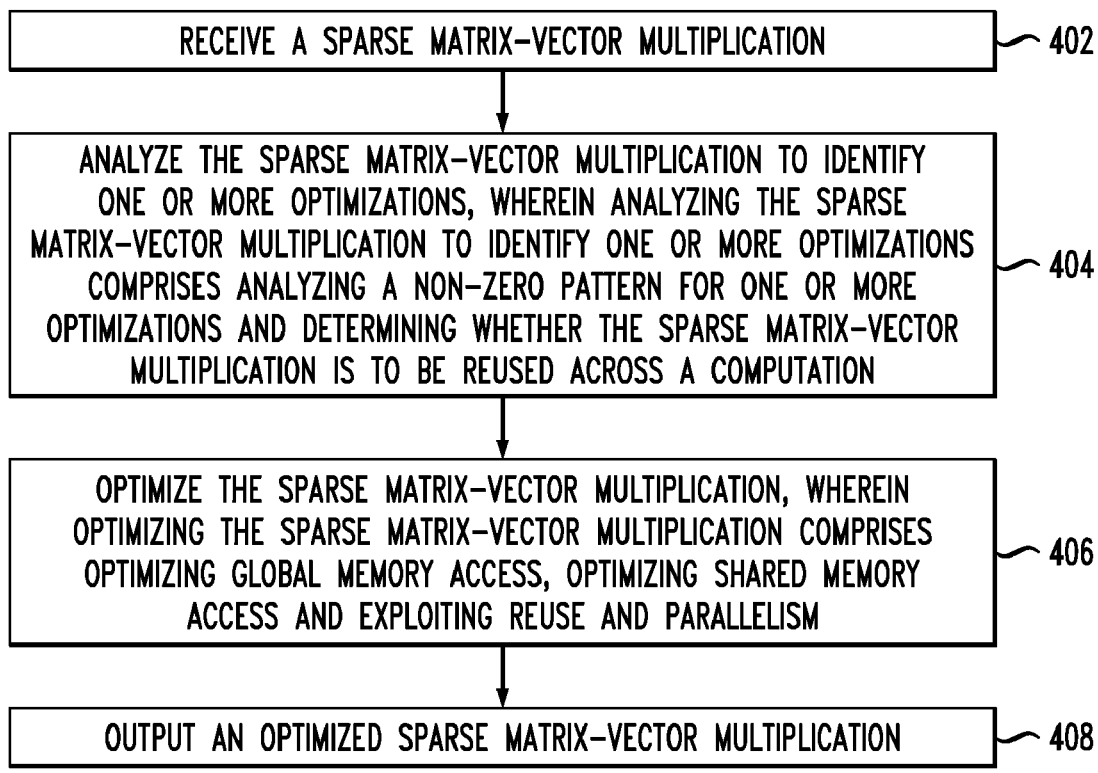
FIG. 4 is a flow diagram illustrating techniques for optimizing sparse matrix-vector multiplication (SpMV) on a graphics processing unit (GPU), according to an embodiment of the invention.

FIG. 4 is a flow diagram illustrating techniques for optimizing sparse matrix-vector multiplication (SpMV) on a graphics processing unit (GPU), according to an embodiment of the present invention. Step 402 includes receiving a sparse matrix-vector multiplication (for example, a non-optimized SpMV).

Step 404 includes analyzing the sparse matrix-vector multiplication to identify one or more optimizations, wherein analyzing the sparse matrix-vector multiplication to identify one or more optimizations comprises analyzing a non-zero pattern for one or more optimizations and determining whether the sparse matrix-vector multiplication is to be reused across a computation. The optimizations can include, for example, exploiting synchronization-free parallelism, optimized thread mapping based on affinity towards optimal memory access pattern, optimized off-chip memory access to tolerate high access latency, and/or exploiting data locality and reuse.

Step 406 includes optimizing the sparse matrix-vector multiplication, wherein optimizing the sparse matrix-vector multiplication comprises optimizing global memory access, optimizing shared memory access and exploiting reuse and parallelism. Optimizing the sparse matrix-vector multiplication can include characterizing memory access cost, type and level of memory, and access pattern, as well as exploiting data locality. Exploiting reuse can include caching each element in on-chip memories, and exploiting parallelism can include exploiting synchronization-free parallelism. Additionally, step 408 includes outputting an optimized sparse matrix-vector multiplication.

The techniques depicted in FIG. 4 can also include performing a run-time preprocessing of the sparse matrix-vector multiplication to identify and extract dense sub-blocks. Additionally, one or more embodiments of the invention include tuning configuration parameters such as, for example, varying a number of threads per thread block used for execution, varying a number of threads handling a row, etc.

The techniques depicted in FIG. 4 can also, as described herein, include providing a system, wherein the system includes distinct software modules, each of the distinct software modules being embodied on a tangible computer-readable recordable storage medium. The distinct software modules can include, for example, an inspector-analyzer module, an optimizer module, a cost model module and an executor module executing on a hardware processor.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 5:
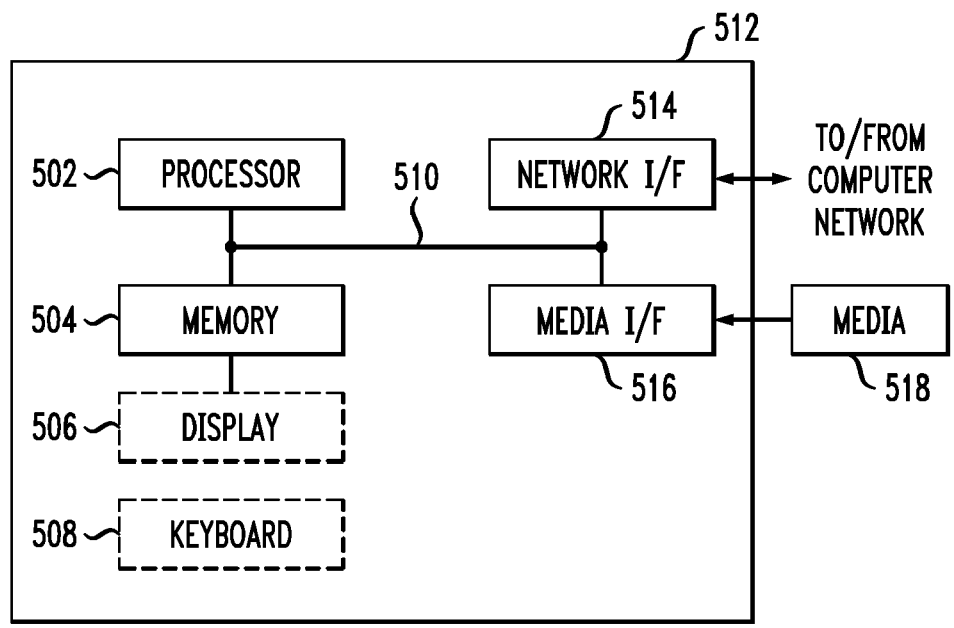
FIG. 5 is a system diagram of an exemplary computer system on which at least one embodiment of the invention can be implemented.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 3. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, taking into account various architectural constraints for optimizing memory access patterns to optimize sparse matrix-vector multiplication (SpMV) on graphics processing units (GPUs).

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for optimizing sparse matrix-vector multiplication (SpMV) on a graphics processing unit (GPU), wherein the method comprises:

receiving a sparse matrix-vector multiplication, wherein said receiving is carried out by a distinct software module executing on a hardware processor;

analyzing the sparse matrix-vector multiplication to identify one or more optimizations, wherein analyzing the sparse matrix-vector multiplication to identify one or more optimizations comprises analyzing a non-zero pattern for one or more optimizations and determining whether the sparse matrix-vector multiplication is to be reused across a computation, and wherein said analyzing is carried out by a distinct software module executing on a hardware processor;

optimizing the sparse matrix-vector multiplication, wherein optimizing the sparse matrix-vector multiplication comprises optimizing global memory access, optimizing shared memory access and exploiting reuse and parallelism, wherein said optimizing is carried out by a distinct software module executing on a hardware processor; and outputting an optimized sparse matrix-vector multiplication, wherein said outputting is carried out by a distinct software module executing on a hardware processor.

2. The method of claim 1, wherein optimizing the sparse matrix-vector multiplication further comprises characterizing memory access cost, type and level of memory, and access pattern.

3. The method of claim 1, wherein the one or more optimizations comprise at least one of exploiting synchronization-free parallelism, optimized thread mapping based on affinity towards optimal memory access pattern, optimized off-chip memory access to tolerate high access latency, and exploiting data locality and reuse.

4. The method of claim 1, wherein exploiting parallelism comprises exploiting synchronization-free parallelism.

5. The method of claim 1, wherein optimizing the sparse matrix-vector multiplication further comprises exploiting data locality.

6. The method of claim 1, wherein exploiting reuse comprises caching each element in one or more on-chip memories.

7. The method of claim 1, further comprising performing a run-time preprocessing of the sparse matrix-vector multiplication to identify and extract one or more dense sub-blocks.

8. The method of claim 1, further comprising tuning one or more configuration parameters.

9. The method of claim 8, wherein tuning one or more configuration parameters comprises varying a number of threads per thread block used for execution.

10. The method of claim 8, wherein tuning one or more configuration parameters comprises varying a number of threads handling a row.

11. The method of claim 1, further comprising providing a system, wherein the system comprises one or more distinct software modules, each of the one or more distinct software modules being embodied on a tangible computer-readable recordable storage medium, and wherein the one or more distinct software modules comprise an inspector-analyzer module, an optimizer module, a cost model module and an executor module executing on a hardware processor.

12. A computer program product comprising a tangible computer readable recordable storage medium including computer useable program code for optimizing sparse matrix-vector multiplication (SpMV) on a graphics processing unit (GPU), the computer program product including:
    computer useable program code for receiving a sparse matrix-vector multiplication;
    computer useable program code for analyzing the sparse matrix-vector multiplication to identify one or more optimizations, wherein analyzing the sparse matrix-vector multiplication to identify one or more optimizations comprises analyzing a non-zero pattern for one or more optimizations and determining whether the sparse matrix-vector multiplication is to be reused across a computation;
    computer useable program code for optimizing the sparse matrix-vector multiplication, wherein optimizing the sparse matrix-vector multiplication comprises optimizing global memory access, optimizing shared memory access and exploiting reuse and parallelism; and
    computer useable program code for outputting an optimized sparse matrix-vector multiplication.

13. The computer program product of claim 12, wherein the computer useable program code for optimizing the sparse matrix-vector multiplication comprises computer useable program code for characterizing memory access cost, type and level of memory, and access pattern.

14. The computer program product of claim 12, wherein the one or more optimizations comprise at least one of exploiting synchronization-free parallelism, optimized thread mapping based on affinity towards optimal memory access pattern, optimized off-chip memory access to tolerate high access latency, and exploiting data locality and reuse.

15. The computer program product of claim 12, wherein the computer useable program code for optimizing the sparse matrix-vector multiplication comprises computer useable program code for exploiting data locality.

16. The computer program product of claim 12, further comprising computer useable program code for performing a run-time preprocessing of the sparse matrix-vector multiplication to identify and extract one or more dense sub-blocks.

17. The computer program product of claim 12, further comprising computer useable program code for tuning one or more configuration parameters.

18. The computer program product of claim 15, wherein the computer useable program code comprises one or more distinct software modules, and wherein the one or more distinct software modules comprise an inspector-analyzer module, an optimizer module, a cost model module and an executor module executing on a hardware processor.

19. A system for optimizing sparse matrix-vector multiplication (SpMV) on a graphics processing unit (GPU), comprising:
    a memory; and
    at least one processor coupled to the memory and operative to:
        receive a sparse matrix-vector multiplication;
        analyze the sparse matrix-vector multiplication to identify one or more optimizations, wherein analyzing the sparse matrix-vector multiplication to identify one or more optimizations comprises analyzing a non-zero pattern for one or more optimizations and determining whether the sparse matrix-vector multiplication is to be reused across a computation;
        optimize the sparse matrix-vector multiplication, wherein optimizing the sparse matrix-vector multiplication comprises optimizing global memory access, optimizing shared memory access and exploiting reuse and parallelism; and
        output an optimized sparse matrix-vector multiplication.

20. The system of claim 19, wherein the at least one processor coupled to the memory operative to optimize the sparse matrix-vector multiplication is further operative to characterize memory access cost, type and level of memory, and access pattern.

21. The system of claim 19, wherein the one or more optimizations comprise at least one of exploiting synchronization-free parallelism, optimized thread mapping based on affinity towards optimal memory access pattern, optimized off-chip memory access to tolerate high access latency, and exploiting data locality and reuse.

22. The system of claim 19, wherein the at least one processor coupled to the memory is further operative to perform a run-time preprocessing of the sparse matrix-vector multiplication to identify and extract one or more dense sub-blocks.

23. The system of claim 19, wherein the at least one processor coupled to the memory is further operative to tune one or more configuration parameters.

24. The system of claim 19, further comprising a tangible computer-readable recordable storage medium having one or more distinct software modules embodied thereon, wherein the one or more distinct software modules comprise an inspector-analyzer module, an optimizer module, a cost model module and an executor module executing on a hardware processor.

25. An apparatus for optimizing sparse matrix-vector multiplication (SpMV) on a graphics processing unit (GPU), the apparatus comprising:
- means for receiving a sparse matrix-vector multiplication;
- means for analyzing the sparse matrix-vector multiplication to identify one or more optimizations, wherein analyzing the sparse matrix-vector multiplication to identify one or more optimizations comprises analyzing a non-zero pattern for one or more optimizations and determining whether the sparse matrix-vector multiplication is to be reused across a computation;
- means for optimizing the sparse matrix-vector multiplication, wherein optimizing the sparse matrix-vector multiplication comprises optimizing global memory access, optimizing shared memory access and exploiting reuse and parallelism; and
- means for outputting an optimized sparse matrix-vector multiplication.

* * * * *